May 16, 1933.     V. M. OREAR ET AL     1,909,003
CONICAL ICE CREAM ARTICLE FORMING MACHINE
Filed Feb. 21, 1930
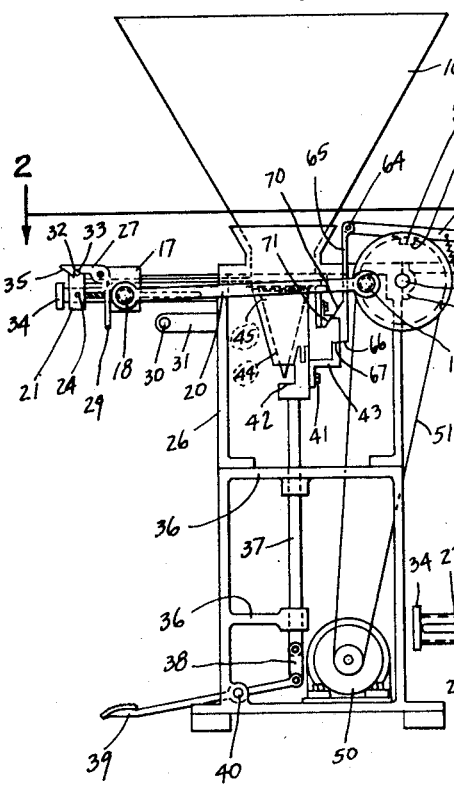
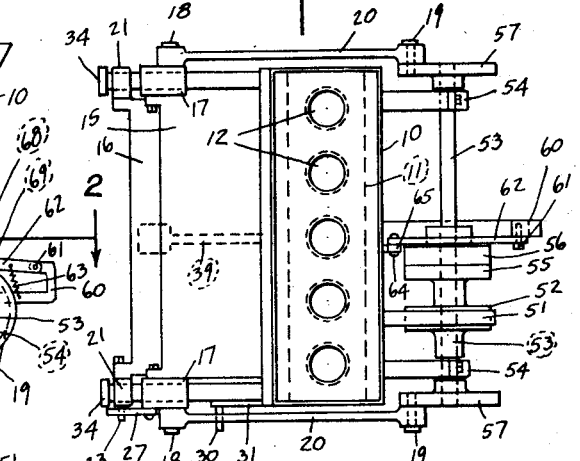
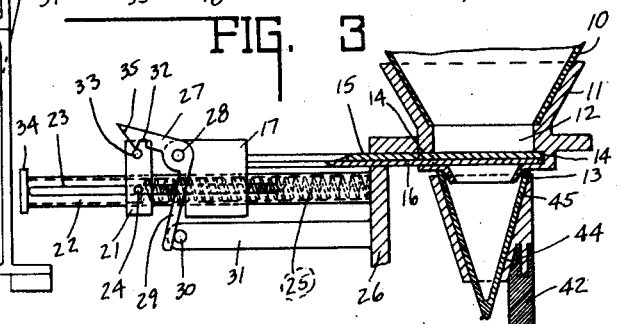
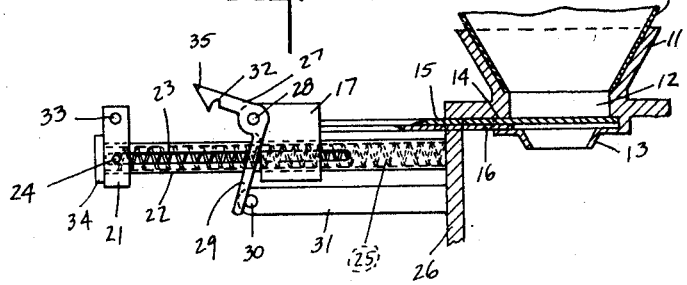
INVENTORS.
VINCENT M. OREAR.
HENRY J. OTTO.
BY
Lockwood Lockwood Goldsmith & Galt
ATTORNEYS.

Patented May 16, 1933

1,909,003

UNITED STATES PATENT OFFICE

VINCENT M. OREAR AND HENRY J. OTTO, OF EVANSVILLE, INDIANA, ASSIGNORS, BY MESNE ASSIGNMENTS, TO ARDEE PATENTS CORPORATION, OF EVANSVILLE, INDIANA

CONICAL ICE CREAM ARTICLE FORMING MACHINE

Application filed February 21, 1930. Serial No. 430,249.

This invention relates to a device for handling a plastic material that is compressible and supplying to a receptacle a predetermined mass of said material.

The chief object of this invention is to supply in a sanitary manner a predetermined mass of a plastic material such as ice cream or the like.

In the dispensing of ice cream through the employment of dippers and similar dispensing apparatus, the ice cream sold is compressed in filling the dipper so that for example, a five-gallon can of cream in the bulk will probably yield anywhere from three and one-half to five gallons with an average of about four gallons when retailed as cones and the like. This condition results from the fact that ice cream has in it about fifty percent air; in other words, the so called overrun in ice cream is about one hundred percent and consequently the retailer purchasing five gallons of bulk ice cream purchases two and one-half gallons of air and two and one-half gallons of solid material. In dispensing, the attendant compresses the solid material into closer relationship and therefore the result is that the total sales derived from the five gallon can average about four gallons or thereabouts. This twenty to twenty-five percent loss is a material factor in the sale of cones and the like by the retailer.

As heretofore indicated, the object of this invention is first to insure that the retailer who has purchased a predetermined bulk of ice cream sells as and for cones, sundaes, etc., a predetermined portion of that bulk so that the retail purchaser only receives that for which has paid and no more or less than that.

Another object of the present invention is to eliminate the unsanitary use of dippers and other similar mechanism now employed in dispensing cones and making of edible coated ice cream bodies.

The present mechanism, therefore, permits the packaging of a predetermined mass of plastic material that is compressible such as ice cream and the dispensing thereof in a sanitary container which improves its salability to the ultimate consumer. Even though the cost of individual packaging is included, the small retailer is able to obtain for the same a better profit and a certain profit and the consumer pays no more.

The full nature of the invention will be understood from the accompanying drawing and the following description and claims:

In the drawing, Fig. 1 is a side elevational view of the invention with the parts in a position immediately prior to cutting off the flow of material.

Fig. 2 is a top plan view of the invention taken in the plane of line 2—2 with hopper removed.

Fig. 3 is an enlarged transverse sectional view through the hopper throat and cut-off mechanism and illustrates the parts in the cut-off position.

Fig. 4 is a similar view illustrating the parts in the final position and the same represents also the normal position of the machine.

In the drawing 10 indicates a hopper that is supported by a truncated base 11 which terminates in an orifice 12, the latter supporting a centering and guiding throat 13. Interposed between the throat 13 and the orifice 12 and slidably mounted in the passageway 14, are the cut-off blade 15 and smoothing blade 16, the latter being positioned below the former.

The blades 15 and 16 are reciprocated to and fro in the passageway 14 through the cross-head 17 which cross-head is connected as at 18 to an eccentric pin 19 by the rod or link 20.

The blade 16 has movement independent of blade 15 and said blade 16 is connected to a plunger 21, slidably supported upon a stationary guide 22. A slot 23 therein receives pin 24 carried by plunger 21 and a coil spring 25 bears against the frame 26 of the machine, and bears against said plunger and normally tends to project the smoothing plate 16 out of registration with orifice 12 in the passageway. In the movement of the cross-head 17 towards the orifice a pivoted lever 27, pivoted at 28 on said cross-head, has a depending portion 29 engaging a pin 30 carried by an arm 31, mounted on the frame. The arm engaging said pin tilts the lever 27 and raises the other arm thereof so that the recess 32 is raised to release the lever from the pin 33 carried by the plunger. Immediately thereupon the spring 25 becomes effective and projects the plunger to the left until it engages the stop 34 carried by the guide 22. In this movement the smoothing plate 16 is retracted from orifice registration to the position of the parts, as shown in Fig. 4.

When the cross-head and cut-off plate are retracted the lever 27 has its cam portion 35 ride over pin 33 until the latter seats in the recess 32. Then upon return movement of the cross-head the plunger returns with the cross-head so that both plates move simultaneously into registration with the recess for cutting off and smoothing operations. The return of the smoothing plate is relatively quick and secures a smooth surface on the top of the material severed from the main body in the hopper.

Slidably supported in the cross members 36 is a slidable suitable upright support 37 connected by a link arrangement 38 to a foot treadle 39 pivoted at 40. Adjustably mounted on the upright 37, as at 41, is a receptacle holder 42 and also supported by said holder is an actuating member 43. The holder 42 is recessed as at 44 to receive a receptacle herein shown in the form of a cone 45. The holder 42 is provided with five recesses 44. Although the same are not shown, five orifices 12 are shown, see Fig. 2. The number of orifices may be any required or desired and the same may be arranged in tandem, as shown, or in multiple rows or in multiple rows and in tandem.

An electric motor or the like 50 through suitable means such as a belt 51, drives a power pulley 52 and herein said pulley is rotatably mounted upon a shaft 53 rotatably supported in bearings 54 carried by the frame of the machine. The shaft rotatably supports one portion of a clutch 55 and associated therewith is a clutch 56 that is keyed to the shaft 53. The shaft 53 is extended and the ends mount the plates 57, each of which carries the eccentric pin 19. The clutch member 56 is engaged with clutch 55 when a suitable trigger mechanism is associated therewith.

This trigger mechanism and tripping mechanism is shown clearly in Fig. 1. An arm 60 pivotally supports at 61 a lever at 62, normally constrained by spring 63 towards "riding" the clutch. The extended end of the lever pivotally supports as at 64 a slidably supported tripping member 65. The same includes a stop portion 66 that is normally engaged by the stop portion 67 of member 43. In the upward movement of the receptacle holder 42, face 67 engages face 66 and moves the member 65 upwardly. In this movement and when it attains a certain position, the tooth 68 is disengaged from a slot 69 in a clutch member and thus the clutch is released from its restraint and through suitable mechanism not shown, the clutch is engaged with the other clutch member, causing the shaft 53 to rotate and thereby causing the eccentrics 19 to be rotated.

In the continued elevational movement of the receptacle holder, a cam portion 70 of the released member 65 engages a stationary cam 71 and the face 66 is freed from the stop 67 and moves toward the right and falls down below the same. When this occurs the tooth 68 rides upon the cylindrical face of the clutch that is rotating and when the socket or recess 69 again registers, the tooth 68, through the spring 63, seats therein and the power is disconnected. In other words, a single cycle of operation is automatically obtained and such cycle of operation is automatically initiated when the receptacle holder reaches a predetermined position relative to the hopper.

The operations of the several parts including the blades, has been heretofore described and need not here be repeated.

The invention claimed is:

1. In a machine for handling a compressible plastic mix, the combination of a hopper, a receptacle associating throat therebeneath, a pair of parallel blades interposed therebetween, and means arranged to project both blades into separating position for separation of the hopper and throat and then retract the blade closest to the throat for smoothing purposes.

2. In a machine for supplying a compressible plastic mix to a receptacle, the combination of a hopper having an open discharge mouth, a cutoff blade for closing said mouth, a receptacle holder positioned beneath said hopper mouth, means for moving said holder into position adjacent the hopper mouth, means for reciprocating said cutoff blade, and cyclic means initiated by the movement of the receptacle holder toward the adjacent position for operating said reciprocating means and arranged to automatically cease reciprocation upon completion of the cycle.

3. In a machine for supplying a compressible plastic mix to a receptacle, the combination of a hopper having an open discharge mouth, a cutoff blade for closing said mouth, a receptacle holder positioned beneath said hopper mouth, means for moving said holder into position adjacent the hopper mouth, means for reciprocating said cutoff blade, cyclic means initiated by the movement of the receptacle holder toward the adjacent position for operating said reciprocating means and arranged to automatically cease reciprocation upon completion of the cycle, a smoothing blade associated with the cutoff blade and movable therewith into cutoff position, means associated with said smoothing blade for retracting the same for smoothing following cutoff, and means actuatable upon movement into the cutoff position for storing energy sufficient for subsequent smoothing operation.

4. A machine for filling a receptacle with a plastic compressible mix comprising a receptacle holder, a hopper for the mix, means positioning said hopper and said holder into immediate and spaced positioning relative to each other, dual cut off mechanism for controlling the mix discharge from the hopper to the receptacle, means operable in timed relation to the positioning means to retract the cut off mechanism to permit mix discharge from the hopper to the receptacle and subsequently stop the discharge from the hopper to the receptacle, and other means arranged to automatically actuate a portion of the cut off mechanism upon the cut off mechanism attaining cut off position and for smoothing the top of the cut off material.

5. In a machine of the character described, the combination with a hopper for the material, a receptacle associating throat immediately therebeneath but slightly spaced therefrom, a pair of abutting parallel superposed blades positioned in the plane of the spacing for cut off and smoothing, and means arranged to actuate the lowermost plate for smoothing when both plates are fully interposed between the hopper and throat.

In witness whereof, we have hereunto affixed our signatures.

VINCENT M. OREAR.
HENRY J. OTTO.